United States Patent
Liu et al.

(10) Patent No.: US 12,532,217 B2
(45) Date of Patent: Jan. 20, 2026

(54) MEASURING PERFORMANCE OF PACKET DATA CONVERGENCE PROTOCOL DUPLICATION

(71) Applicant: QUALCOMM Incorporated, San Diego, CA (US)

(72) Inventors: Huichun Liu, Beijing (CN); Gavin Bernard Horn, La Jolla, CA (US); Xipeng Zhu, San Diego, CA (US); Karthika Paladugu, San Diego, CA (US); Peng Cheng, Beijing (CN); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 17/753,102

(22) PCT Filed: Sep. 24, 2019

(86) PCT No.: PCT/CN2019/107431
§ 371 (c)(1),
(2) Date: Feb. 18, 2022

(87) PCT Pub. No.: WO2021/056168
PCT Pub. Date: Apr. 1, 2021

(65) Prior Publication Data
US 2022/0338058 A1    Oct. 20, 2022

(51) Int. Cl.
*H04W 28/06* (2009.01)
*H04W 24/10* (2009.01)

(52) U.S. Cl.
CPC ........... *H04W 28/06* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2001/0017850 A1* | 8/2001 | Kalliokulju | H04L 69/324 370/340 |
| 2006/0218271 A1* | 9/2006 | Kasslin | H04L 1/0026 709/224 |

(Continued)

FOREIGN PATENT DOCUMENTS

| | | |
|---|---|---|
| CN | 101933280 A | 12/2010 |
| CN | 110149709 A | 8/2019 |
| WO | 2018171734 A1 | 9/2018 |

OTHER PUBLICATIONS

Supplementary European Search Report—EP19947281—Search Authority—Munich—May 8, 2023.

(Continued)

*Primary Examiner* — Hassan A Phillips
*Assistant Examiner* — Gautam Sharma
(74) *Attorney, Agent, or Firm* — Harrity & Harrity, LLP

(57) ABSTRACT

Various aspects of the present disclosure generally relate to wireless communication. In some aspects, a wireless communication device may detect a trigger to initiate determination of a performance parameter for a packet data convergence protocol (PDCP) duplication procedure associated with a PDCP instance. The wireless communication device may receive packets of the PDCP instance via multiple radio link control (RLC) entities according to the PDCP duplication procedure. The wireless communication device may determine the performance parameter based at least in part on whether packets of the PDCP instance are successfully received via one or more RLC entities of the multiple RLC entities. Numerous other aspects are provided.

35 Claims, 9 Drawing Sheets

(56) References Cited

U.S. PATENT DOCUMENTS

| | | | | | |
|---|---|---|---|---|---|
| 2006/0271313 | A1* | 11/2006 | Mollenkopf | ...... | H02J 13/00028 702/62 |
| 2010/0180042 | A1* | 7/2010 | Gemmell | ......... | H04N 21/64738 455/3.01 |
| 2012/0014264 | A1* | 1/2012 | Wang | ............ | H04W 36/08 370/252 |
| 2013/0114446 | A1* | 5/2013 | Liu | ......... | H04W 24/10 370/252 |
| 2013/0195251 | A1* | 8/2013 | Saigusa | ............ | H05G 1/30 378/101 |
| 2013/0322265 | A1* | 12/2013 | Kozisek | ............ | H04L 41/142 370/251 |
| 2015/0350988 | A1* | 12/2015 | Himayat | ............ | H04W 36/22 370/331 |
| 2018/0279168 | A1 | 9/2018 | Jheng et al. | | |
| 2018/0279262 | A1* | 9/2018 | Babaei | .................. | H04L 1/1848 |
| 2018/0324642 | A1 | 11/2018 | Yu et al. | | |
| 2019/0082363 | A1* | 3/2019 | Park | ........ | H04W 76/18 |
| 2019/0253919 | A1* | 8/2019 | Wu | ........ | H04W 4/40 |
| 2019/0253926 | A1 | 8/2019 | Kim et al. | | |
| 2019/0253945 | A1 | 8/2019 | Paladugu et al. | | |
| 2020/0359450 | A1* | 11/2020 | Xu | ........ | H04W 80/02 |
| 2022/0338058 | A1* | 10/2022 | Liu | ........ | H04W 24/10 |

OTHER PUBLICATIONS

International Search Report and Written Opinion—PCT/CN2019/107431—ISAEPO—Jun. 23, 2020.

Vivo: "Consideration on Multi-leg PDCP Duplication", 3GPP TSG-RAN WG2 Meeting #104, R2-1816941, Spokane, USA, Nov. 12-16, 2018, Nov. 16, 2018 (Nov. 16, 2018), 2 Pages, the whole document.

* cited by examiner

MEASURING PERFORMANCE OF PACKET DATA CONVERGENCE PROTOCOL DUPLICATION

CROSS-REFERENCE TO RELATED APPLICATION

This application is a 371 national stage of PCT Application No. PCT/CN2019/107431 filed on Sep. 24, 2019, entitled "MEASURING PERFORMANCE OF PACKET DATA CONVERGENCE PROTOCOL DUPLICATION," which is hereby expressly incorporated by reference herein.

FIELD OF THE DISCLOSURE

Aspects of the present disclosure generally relate to wireless communication and to techniques and apparatuses for measuring performance of packet data convergence protocol (PDCP) duplication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include detecting a trigger to initiate determination of a performance parameter for a packet data convergence protocol (PDCP) duplication procedure associated with a PDCP instance; receiving packets of the PDCP instance via multiple radio link control (RLC) entities according to the PDCP duplication procedure; and determining the performance parameter based at least in part on whether packets of the PDCP instance are successfully received via one or more RLC entities of the multiple RLC entities.

In some aspects, a wireless communication device for wireless communication may include memory and one or more processors operatively coupled to the memory. The memory and the one or more processors may be configured to detect a trigger to initiate determination of a performance parameter for a PDCP duplication procedure associated with a PDCP instance; receive packets of the PDCP instance via multiple RLC entities according to the PDCP duplication procedure; and determine the performance parameter based at least in part on whether packets of the PDCP instance are successfully received via one or more RLC entities of the multiple RLC entities.

In some aspects, a non-transitory computer-readable medium may store one or more instructions for wireless communication. The one or more instructions, when executed by one or more processors of a wireless communication device, may cause the one or more processors to: detect a trigger to initiate determination of a performance parameter for a PDCP duplication procedure associated with a PDCP instance; receive packets of the PDCP instance via multiple RLC entities according to the PDCP duplication procedure; and determine the performance parameter based at least in part on whether packets of the PDCP instance are successfully received via one or more RLC entities of the multiple RLC entities.

In some aspects, an apparatus for wireless communication may include means for detecting a trigger to initiate determination of a performance parameter for a PDCP duplication procedure associated with a PDCP instance; means for receiving packets of the PDCP instance via multiple RLC entities according to the PDCP duplication procedure; and means for determining the performance parameter based at least in part on whether packets of the PDCP instance are successfully received via one or more RLC entities of the multiple RLC entities.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
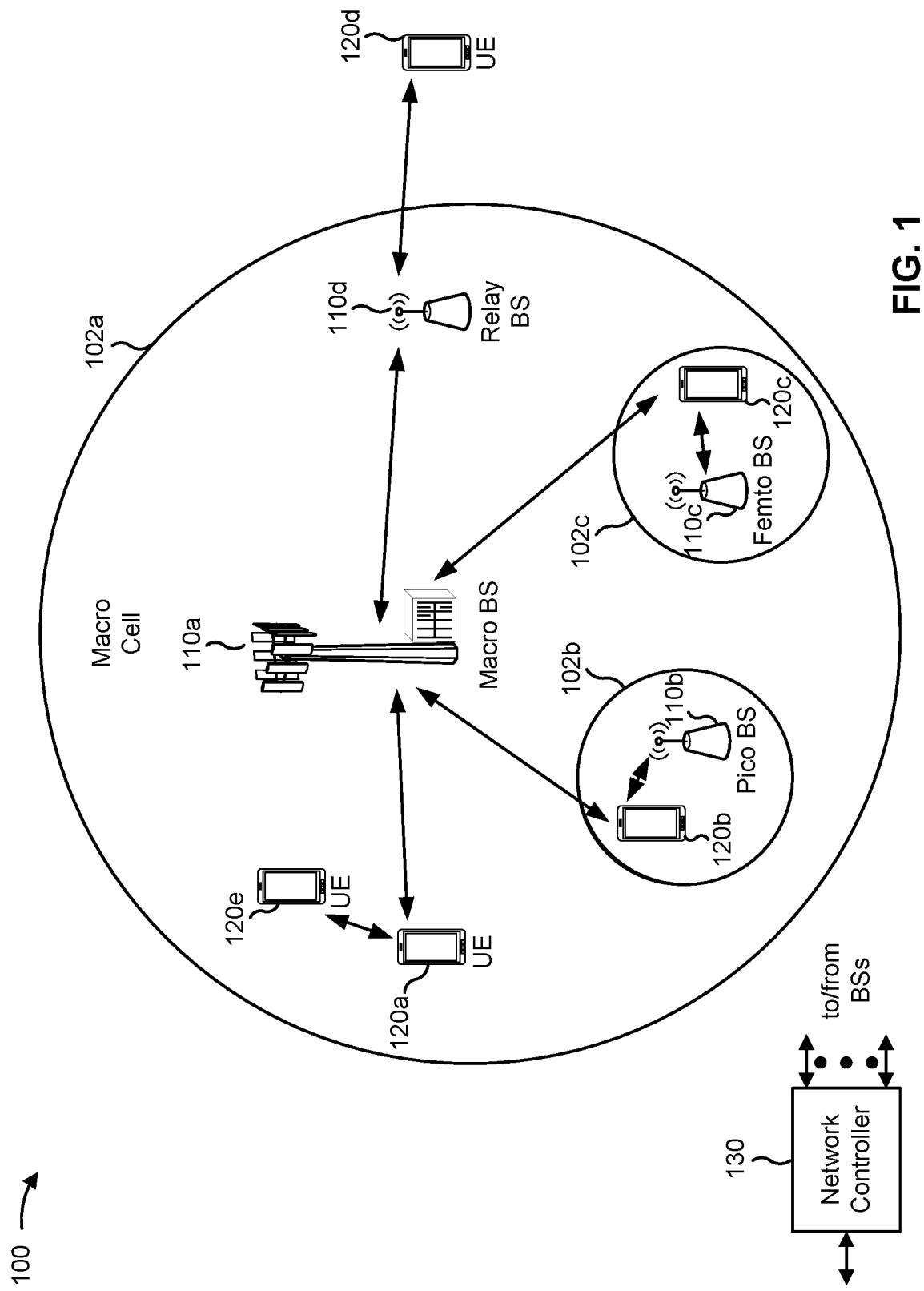
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
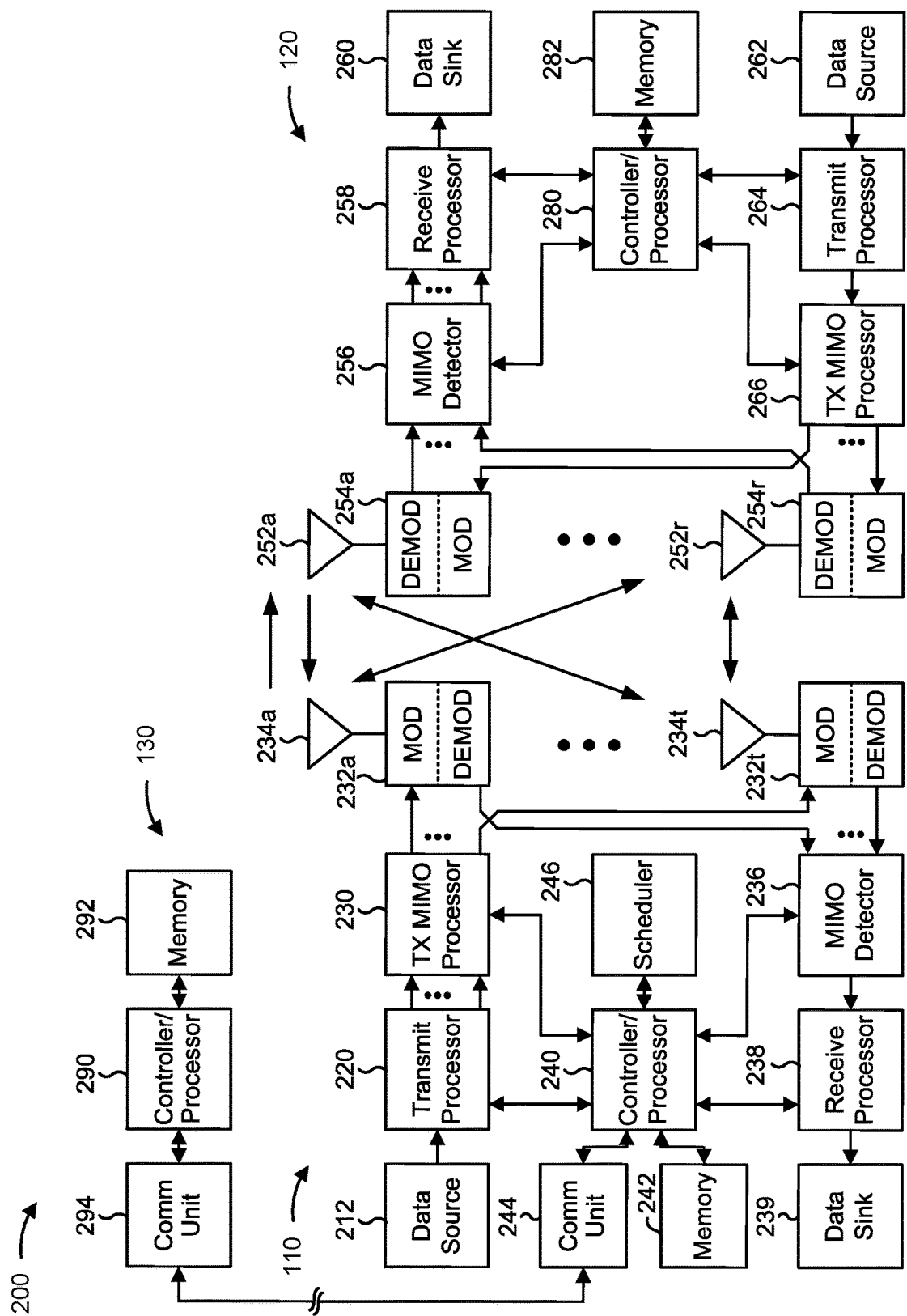
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with measuring the performance of PDCP duplication, as described in more detail elsewhere herein. For example, controller/processor 240 of base station 110, controller/processor 280 of UE 120, and/or any other component(s) of FIG. 2 may perform or direct operations of, for example, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, and/or other processes as described herein. A scheduler 246 may schedule UEs for data transmission on the downlink and/or uplink.

In some aspects, UE 120 may include means for detecting a trigger to initiate determination of a performance parameter for a PDCP duplication procedure associated with a PDCP instance, means for receiving packets of the PDCP instance via multiple RLC entities according to the PDCP duplication procedure, means for determining the performance parameter based at least in part on whether packets of the PDCP instance are successfully received via one or more RLC entities of the multiple RLC entities, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for detecting a trigger to initiate determination of a performance parameter for a PDCP duplication procedure associated with a PDCP instance, means for receiving packets of the PDCP instance via multiple RLC entities according to the PDCP duplication procedure, means for determining the performance parameter based at least in part on whether packets of the PDCP instance are successfully received via one or more RLC entities of the multiple RLC entities, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
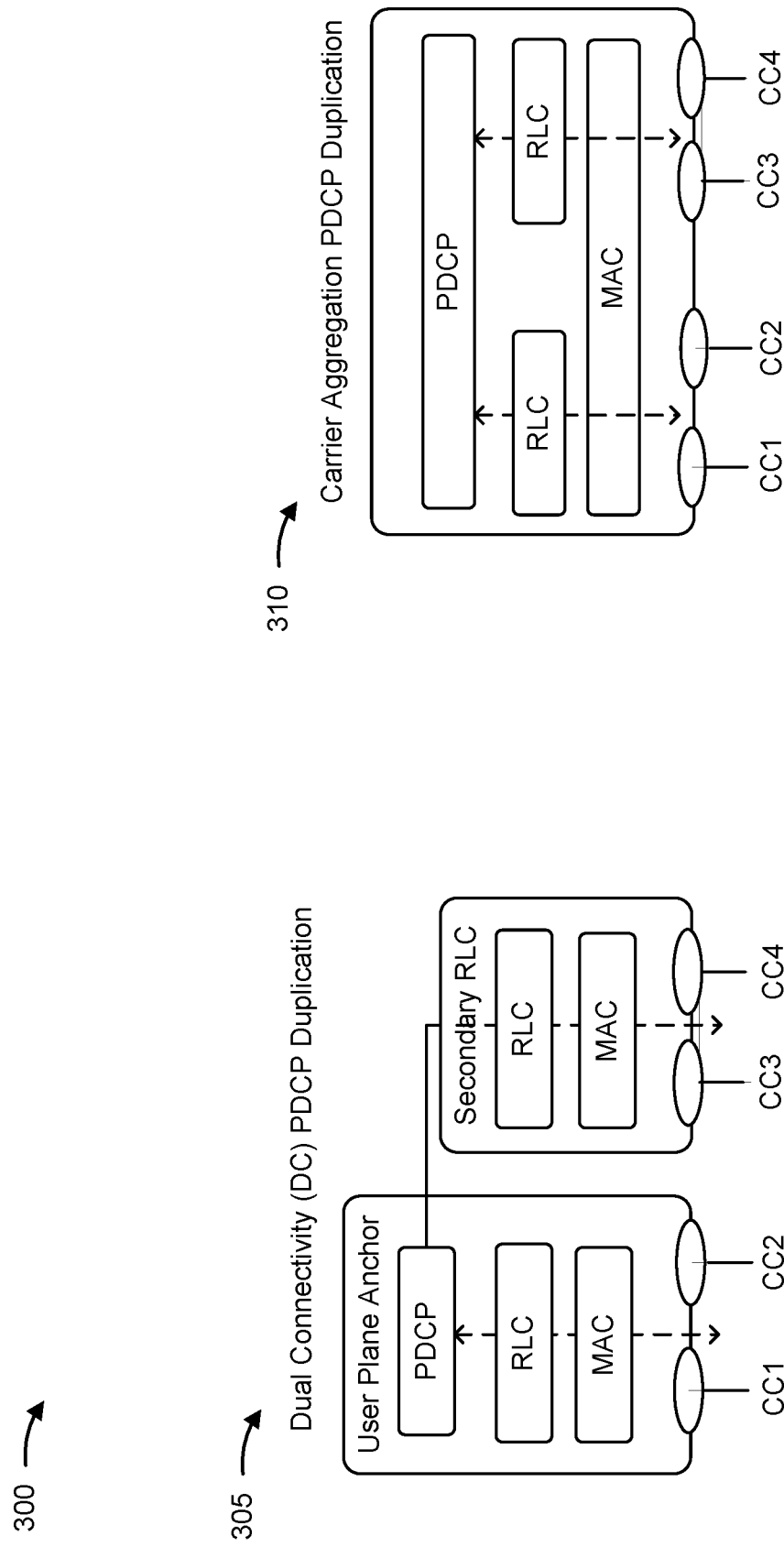
FIG. 3 is a diagram illustrating examples of PDCP duplication, in accordance with various aspects of the present disclosure.

FIG. 3 is a diagram illustrating examples 300 of PDCP duplication, in accordance with various aspects of the present disclosure. A wireless communication device, such as a base station, may communicate with another wireless communication device, such as a UE, using PDCP. PDCP occurs in a PDCP layer located above an RLC layer in a radio protocol stack, below an Internet protocol (IP) layer in a user plane, and below a radio resource control (RRC) layer in a control plane. The wireless communication device may use the PDCP layer to interface with the outside world, and the PDCP layer may enable integrity protection, ciphering, and header compression of packets received from an upper layer (e.g., IP, RRC, and/or the like).

When using the PDCP layer, the wireless communication device may duplicate transmission paths to increase reliability and to reduce latency (e.g., for ultra-reliable low-latency communication, or URLLC). When PDCP duplication is configured for a radio bearer via RRC signaling, the wireless communication device may add a second RLC entity for a second logical channel to the radio bearer to handle duplicated packets. Packets are also referred to herein as packet data units or protocol data units (PDUs). That is, PDCP duplication involves transmitting a same PDCP PDU on two or more RLC entities. A PDCP duplication procedure may be associated with a PDCP instance for the radio bearer. Note that a transmission path through an RLC entity may also be referred to as an RLC leg. The wireless communication device may activate or deactivate PDCP duplication for a dedicated radio bearer (DRB) using, for example, a medium access control (MAC) command element (CE).

The wireless communication device may be configured for PDCP duplication in scenarios involving dual connectivity (DC) or carrier aggregation (CA). As shown in FIG. 3, and by reference number 305, DC PDCP duplication may involve two more RLC entities that are associated with different MAC entities. For example, a primary RLC entity (e.g., user plane anchor) is associated with one MAC entity for component carriers CC1, CC2, and a secondary RLC entity is associated with a different MAC entity for component carriers CC3, CC4. On the other hand, as shown in FIG. 3 and by reference number 310, CA PDCP duplication may involve two or more RLC entities that are associated with a same MAC entity. For example, one RLC entity for CC1 and CC2 is associated with the same MAC entity as another RLC entity for CC3 and CC4.

Additionally, or alternatively, PDCP duplication may be enabled during a scenario involving a handover procedure. For example, the wireless communication device may use PDCP duplication as part of a make-before-break handover (MBB HO) procedure. During this MBB HO procedure, the wireless communication device, if the wireless communication device is being handed over, establishes a source connection with a source base station and a target connection with a target base station. The wireless communication device may transmit a same PDCP PDU on two or more RLC entities for each connection, once a setup for the target connection is successful. This will provide additional reliability until the source connection is released.

In any of these scenarios, if the wireless communication device is not making efficient use of RLC entities during PDCP duplication, this may lead to wasted resources and increased latency. For example, if the wireless communication device is underutilizing one of its RLC entities during PDCP duplication, then the wireless communication device is not transmitting all of the necessary PDCP PDUs on the underutilized RLC entity to carry out PDCP duplication. This underutilization may be due to PDCP PDUs being slowed or dropped on the transmission path for that particular RLC entity. Unfortunately, this underutilization is not being addressed, because the wireless communication device is not measuring the performance of PDCP duplication.

Some aspects, as described herein, configure a wireless communication device to measure the performance of PDCP duplication. The wireless communication device (e.g., a base station, a UE, and/or the like) may measure the performance of PDCP duplication by determining performance parameters of a PDCP duplication procedure (e.g., a number or percentage of PDUs received on the RLC entities). For example, the wireless communication device may detect a trigger to initiate determination of a performance parameter for a PDCP duplication procedure associated with a PDCP instance. The wireless communication device may receive PDUs of the PDCP instance via multiple RLC entities according to the PDCP duplication procedure. The wireless communication device may determine the performance parameter based at least in part on whether PDUs of the PDCP instance are successfully received via one or more RLC entities of the multiple RLC entities.

In some aspects, the wireless communication device may modify a configuration of RLC entities used for PDCP duplication based at least in part on a determined performance parameter. For example, the wireless communication device may deactivate use of an RLC entity that is underutilized for PDCP duplication, add more RLC entities to an associated MAC entity for PDCP duplication, and/or reconfigure PDCP duplication for the MAC entity. In this way, the wireless communication device may not waste processing, power, and/or channel resources by using RLC entities that are inefficient for PDCP duplication. Additionally, or alternatively, the configuration of the RLC entities for PDCP duplication may be optimized. As a result, network reliability and latency may improve over PDCP instances where PDCP duplication is not measured.

As indicated above, FIG. 3 is provided as an example. Other examples may differ from what is described with regard to FIG. 3.

Figure 4:
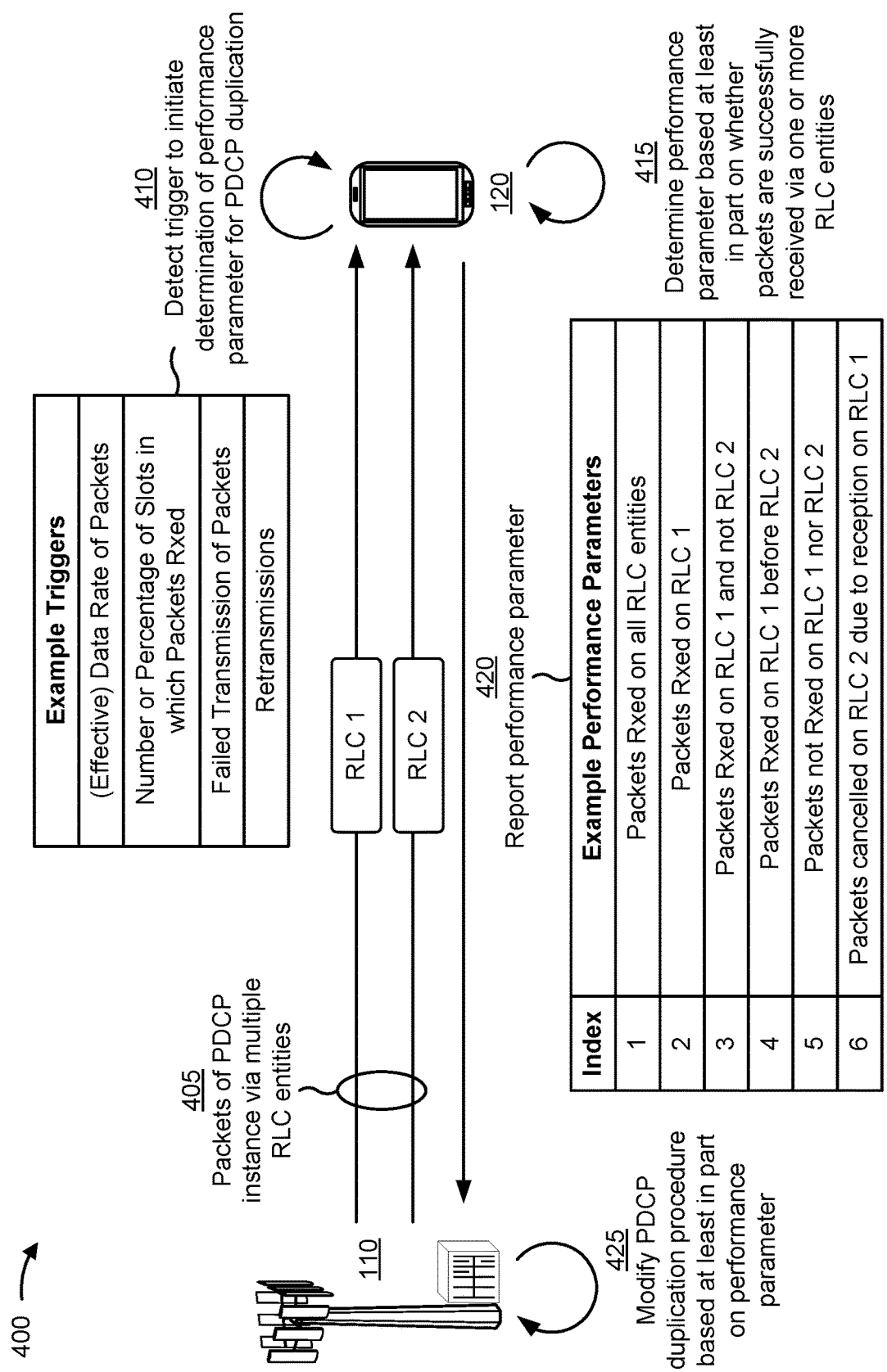
FIGS. 4-8 are diagrams illustrating examples of measuring performance of PDCP duplication, in accordance with various aspects of the present disclosure.

FIG. 4 is a diagram illustrating an example 400 of measuring performance of PDCP duplication, in accordance with various aspects of the present disclosure. As shown in FIG. 4, a wireless communication device (e.g., base station 110) may communicate with another wireless communication device (e.g., UE 120) using PDCP as described above in connection with FIG. 3.

As shown by reference number 405, to carry out PDCP duplication, base station 110 may transmit a PDU of a PDCP instance (PDCP PDU) via multiple RLC entities, such as RLC 1 and RLC 2. While FIG. 4 shows that base station 110 transmits PDUs of a PDCP instance to UE 120 via multiple RLC entities, alternatively, UE 120 may transmit PDUs of a PDCP instance to base station 110. Further, while certain operations are described for base station 110 and UE 120 as depicted in FIG. 4, base station 110 may perform the operations described herein for UE 120, and vice-versa.

As shown by reference number 410, UE 120 may detect a trigger to initiate determination of a performance parameter for PDCP duplication. For example, UE 120 may detect, as the trigger, that a data rate of PDUs of the PDCP instance satisfies a threshold for one or more RLC entities of the multiple RLC entities. UE 120 may measure the date rate based at least in part on a performance parameter determined in a PDCP layer or a MAC layer. In some aspects, if UE 120 is to determine a performance parameter in the PDCP layer, UE 120 may measure the data rate after discarding duplicated PDUs in the PDCP layer. This allows for UE 120 to calculate an effective data rate for each RLC entity. If UE 120 is to determine a performance parameter in the MAC layer, UE 120 may measure a data rate for each duplicated logical channel or RLC entity.

Additionally, or alternatively, UE 120 may detect, as the trigger, that a number or percentage of slots in which PDUs of the PDCP instance are received satisfies a threshold for one or more RLC entities of the multiple RLC entities. In some aspects, UE 120 may attempt to utilize each RLC entity and may, therefore, determine the above-identified number or percentage of slots for each RLC entity. In some aspects, UE 120 may be configured such that UE 120 detects a trigger for particular RLC entities, based at least in part on past utilization. Accordingly, UE 120 may determine the above-identified number or percentage of slots for a subset of RLC entities, such as those RLC entities that have been more efficient or that have dropped fewer PDUs. In some aspects, UE 120 may determine the above-identified number or percentage of slots for a different subset of RLC entities, such as those RLC entities that have not been more efficient or that have regularly dropped PDUs.

Additionally, or alternatively, UE 120 may detect, as the trigger, that a number or percentage of PDUs of the PDCP instance that are not successfully received satisfies a threshold for one or more RLC entities of the multiple RLC entities. This may include, for example, the number or percentage of RLC PDUs that have a corresponding negative acknowledgement (NAK) message, indicating that transmission of a PDU has not succeeded or failed. UE 120 may determine and report a number of NAKed PDUs received during a certain period of time. UE 120 may report this number based at least in part on a comparison of the number of NAKed PDUs and a threshold, an average, a maximum, and/or a minimum for NAKed PDUs.

Additionally, or alternatively, UE 120 may detect, as the trigger, that a number or percentage of retransmissions of PDUs of the PDCP instance satisfies a threshold for one or more RLC entities of the multiple RLC entities. In some aspects, one or more thresholds may correspond to a histogram of the number or percentage of retransmissions for each RLC entity. In some aspects, UE 120 may determine counts of retransmissions for each RLC entity and record the counts in a histogram. UE 120 may consider an RLC entity to be efficient with respect to other RLC entities if the RLC entity has a number or percentage of retransmissions that is less than another RLC entity, less than all other RLC entities, less a threshold number of RLC entities, and/or falls into a particular histogram grouping. In some aspects, UE 120 may consider the number or percentage of retransmissions specifically for uplink PDCP duplication. The histogram may be used for other performance parameters, such as other performance parameters described herein.

As shown by reference number 415, UE 120 may determine the performance parameter (e.g., key performance indicator, or KPI) based at least in part on whether PDUs of the PDCP instance are successfully received via one or more RLC entities of the multiple RLC entities. For example, UE 120 may determine a performance parameter that indicates a number or percentage of PDUs of the PDCP instance that are successfully received via all of the multiple RLC entities. This performance parameter may correspond to a performance parameter index (e.g., KPI index of 1) that indicates similar performances of all RLC entities.

Additionally, or alternatively, UE 120 may determine a performance parameter that indicates a number or percentage of PDUs of the PDCP instance that are successfully received via a specific RLC entity of the multiple RLC entities, and/or indicates a number or percentage of PDUs of the PDCP instance that are successfully received via a first RLC entity (RLC 1) of the multiple RLC entities and that are not successfully received via any other RLC entities of the multiple RLC entities. This performance parameter may correspond to a performance parameter index (e.g., KPI index of 2) of prominent performances of certain RLC entities from a reliability perspective (e.g., RLC entities with a higher number of successful transmissions than most other RLC entities).

Additionally, or alternatively, UE 120 may determine a performance parameter that indicates a number or percentage of PDUs of the PDCP instance that are successfully received via a first RLC entity (RLC 1) of the multiple RLC entities and that are not successfully received via a second RLC entity (RLC 2) of the multiple RLC entities. This performance parameter may correspond to another performance parameter index (e.g., KPI of 3) of prominent performances of certain RLC entities from the reliability perspective.

Additionally, or alternatively, UE 120 may determine a performance parameter that indicates a number or percentage of PDUs of the PDCP instance that are successfully received via a first RLC entity of the multiple RLC entities at an earlier time as compared to all other RLC entities of the multiple RLC entities, and/or indicates a number or percentage of PDUs of the PDCP instance that are successfully received via a first RLC entity of the multiple RLC entities at an earlier time as compared to a second RLC entity of the multiple RLC entities. This performance parameter may correspond to a performance parameter index (e.g., KPI of 4) of prominent performances of certain RLC entities from a latency perspective.

Additionally, or alternatively, UE 120 may determine a performance parameter that indicates a number or percentage of PDUs of the PDCP instance that are not successfully received via any of the multiple RLC entities and/or indicates a number or percentage of PDUs of the PDCP instance that are not successfully received via a specific RLC entity of the multiple RLC entities. This performance parameter may correspond to a performance parameter index (e.g., KPI of 5) of "poor" performances of all RLC entities, or RLC entities that are less efficient and/or that drop more PDUs than for most other RLC entities.

Additionally, or alternatively, UE 120 may determine a performance parameter that indicates a number or percentage of PDUs of the PDCP instance that are cancelled or discarded for a specific RLC entity of the multiple RLC entities due to successful reception via another RLC entity of the multiple RLC entities. This performance parameter may correspond to a performance parameter index (e.g., KPI index of 6) of PDCP duplication cancellation.

The performance parameters described above are intended as examples of performance parameters that might be determined by UE 120 and, in some aspects, UE 120 may determine other types of performance parameters. In some aspects, UE 120 may determine one or more of performance parameters for each RLC entity. For example, UE 120 may determine a plurality of performance parameters for one or more RLC entities.

In some aspects, a PDCP duplication procedure may be carried out in the uplink or downlink direction. In some aspects where the wireless communication device is UE 120, the PDCP duplication procedure may be a downlink PDCP duplication procedure, and the multiple RLC entities may be configured in either RLC acknowledged mode or RLC unacknowledged mode. In RLC acknowledged mode, base station 110 may retransmit a PDU if UE 120 receives the PDU with any errors. In RLC unacknowledged mode, base station 110 may not retransmit PDUs that UE 120 receives with errors. RLC unacknowledged mode may be used for delay-sensitive PDUs, such as for audio and video streams. In some aspects where the wireless communication device is UE 120, the PDCP duplication procedure may be an uplink PDCP duplication procedure, and the multiple RLC entities may be configured in RLC acknowledged mode.

In some aspects where the wireless communication device is base station 110, the PDCP duplication procedure may be an uplink PDCP duplication procedure, and the multiple RLC entities may be configured in either RLC acknowledged mode or RLC unacknowledged mode. In some aspects where the wireless communication device is base station 110, the PDCP duplication procedure may be a downlink PDCP duplication procedure, and the multiple RLC entities may be configured in RLC acknowledged mode.

It should be noted that while reference number 405 is described before reference numbers 410 and 415, these operations may take place in any order. For example, UE 120 may be configured by base station 110 in, for example, an RRC message to determine a performance parameter or measure performance, and thereafter receive PDUs of a PDCP instance. As another example, UE 120 may start receiving PDUs of a PDCP instance and only start determining a performance parameter or measuring performance if some trigger is detected.

As shown by reference number 420, UE 120 may report the performance parameter. For example, if the performance parameter is a number or percentage of PDUs received on one or more RLC entities, UE 120 may transmit a message to base station 110 indicating this number or percentage. In some aspects, UE 120 may transmit a message with a value or performance parameter index that corresponds to the number or percentage. This is just an example and the reporting may apply for any or all of the performance parameters described above. The reporting of the performance parameters may provide an accurate indication of a quality of PDCP duplication for multiple RLC entity paths involved in PDCP duplication.

As shown by reference number 425, base station 110, which receives a performance parameter reported by UE 120, may modify a PDCP duplication procedure based at least in part on the performance parameter. For example, base station 110 may deactivate or deconfigure PDCP duplication for one or more RLC entities associated with a MAC entity. As a result, base station 110, and those devices with which base station 110 communicates, may save processing, power, and/or channel resources by refraining from transmitting PDCP PDUs over an inefficient RLC entity during a PDCP duplication procedure. In another example, base station 110 may activate PDCP duplication for a new RLC entity. As a result, communication between base station 110 and UE 120 may be more reliable by transmitting PDCP PDUs on the new RLC entity, which is more efficient than an existing RLC entity used for a PDCP duplication procedure.

In some aspects, base station 110 may reconfigure UE 120 to use DC PDCP duplication or CA PDCP duplication, in response to a report from UE 120 that one or more RLC entities are not sufficient to handle the volume of PDCP PDUs and/or a report that one or more RLC entities are unreliable. Base station 110 may reconfigure UE 120 by adding one or more RLC entities to the PDCP duplication procedure from other transmission paths or devices made available by the use of DC PDCP or CA PDCP.

In some aspects, base station 110 may reconfigure a PDCP duplication procedure for UE 120 from CA PDCP duplication to DC PDCP duplication. An advantage of DC PDCP duplication is that UE 120 may use performance parameters from a plurality of different types of base stations (e.g., LTE, enhanced LTE) and/or different radio access technologies (RATs), while CA PDCP duplication involves a single RAT. Also, for DC PDCP, synchronization is not that strict. In some aspects, if PDCP duplication performance finds that one RLC entity is receiving PDUs successfully while very few PDUs are received on another RLC entity, base station 110 may configure DC PDCP on a new RLC entity to improve PDCP duplication performance.

In some aspects, base station 110 may reconfigure the PDCP duplication procedure from DC PDCP duplication to CA PDCP duplication. Note that for CA PDCP duplication, one transmission/reception point (TRP) or multiple TRPs may be used with PDCP duplication. Also, synchronization may be very strict for CA PDCP so that UE 120 may benefit from the higher capacity made available by using additional carriers without compromising the quality of the communication. Base station 110 may reconfigure the PDCP duplication procedure to or from CA PDCP duplication based at least in part on whether or not strict synchronization is being achieved for CA PDCP or needs to be achieved.

In some aspects, base station 110 may determine and use the performance parameters described above in response to activation of DC PDCP duplication or CA PDCP duplication. That is, base station 110 may detect activation of DC PDCP duplication or CA PDCP duplication, and this activation may be a trigger for determining a PDCP duplication performance parameter.

Additionally, or alternatively, base station 110 or UE 120 may determine and use the performance parameters described above in response to initiation of a handover (e.g., MBB HO), as will be described in relation to FIG. 8. As a result, the base station 110 or UE 120 may help to reduce latency and interruptions that occur during a handover operation.

While various scenarios and performance parameters are described, UE 120 and base station 110 may determine and use any combination of performance parameters in any reasonable combination of scenarios.

As indicated above, FIG. 4 is provided as an example. Other examples may differ from what is described with regard to FIG. 4.

Figure 5:
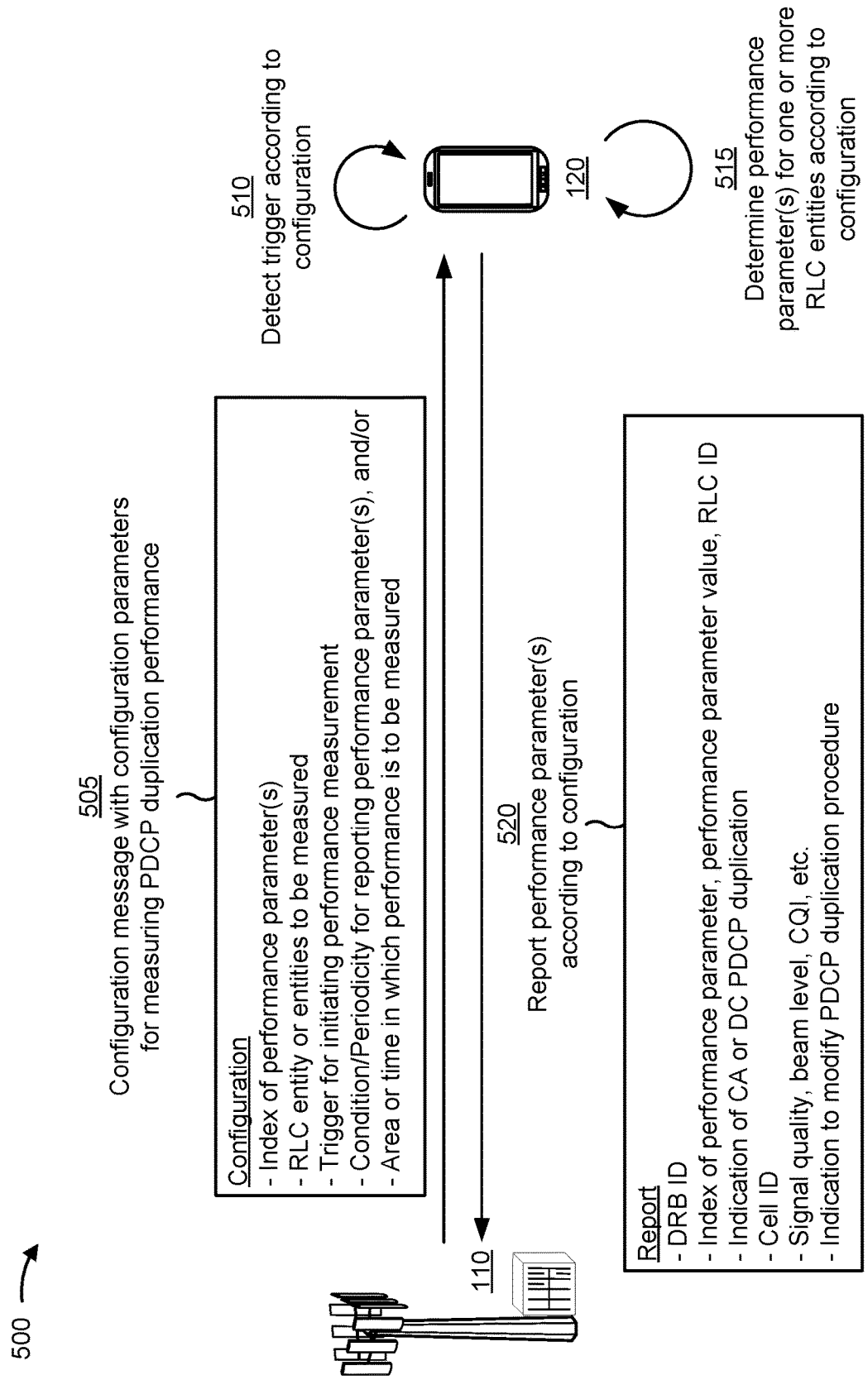

FIG. 5 is a diagram illustrating an example 500 of measuring performance of PDCP duplication, in accordance with various aspects of the present disclosure. As shown in FIG. 5, a wireless communication device (e.g., base station 110) may communicate with another wireless communication device (e.g., UE 120) using PDCP as described above in connection with FIGS. 3 and/or 4.

As shown by reference number 505, UE 120 may receive a configuration message from base station 110, where the configuration message indicates one or more configuration parameters for measuring performance of the PDCP duplication procedure. In some cases, this configuration may be signaled with a radio resource control (RRC) reconfiguration. The one or more configuration parameters in the configuration message may identify one or more performance parameters to be determined by UE 120 (e.g., an index of performance parameters), one or more RLC entities for which the performance parameter is to be determined, a trigger for initiating determination of the performance parameter, a condition for reporting the performance parameter, a periodicity for reporting the performance parameter, an area in which the performance parameter is to be measured, a time during which the performance parameter is to be measured, and/or the like. In some aspects, UE 120 may receive and use a plurality of configuration parameters for one or more RLC entities.

As shown by reference number 510, UE 120 may detect a trigger according to a configuration that includes the one or more configuration parameters. As shown by reference number 515, UE 120 may determine one or more PDCP duplication performance parameters for one or more RLC entities according to the configuration, as described in connection with FIG. 4. As shown by reference number 520, UE 120 may report one or more performance parameters to base station 110, based at least in part on the one or more configuration parameters. For example, UE 120 may report the one or more performance parameters based at least in part on the periodicity for reporting the performance parameter, a determination that the performance parameter satisfies the condition for reporting the performance parameter, a determination that UE 120 has entered or exited the area in which the performance parameter is to be measured, a determination that the time during which the performance parameter is to be measured is occurring (or has elapsed), and/or a combination thereof. In some aspects, UE 120 may report performance parameters in a measurement report and/or in a PDCP PDU.

In some aspects, UE 120 may report a performance parameter that indicates identifying information and/or indicates uplink or downlink. For example, the performance parameter may be a DRB identifier associated with the PDCP duplication procedure, and/or a list of DRB identifiers. The performance parameter may include logical channel identifiers or a cell identifier for certain RLC entities. The performance parameter may be specified for uplink and/or downlink.

In some aspects, UE 120 may report a performance parameter that corresponds to other information. For example, the performance parameter may be a performance parameter index that identifies a performance parameter type of the performance parameter, a report type, and/or a trigger condition (e.g., performance parameter index threshold). The performance parameter may be a period or time interval for reporting, an RLC identifier that indicates an RLC entity associated with the performance parameter, and/or an indication of whether the PDCP duplication procedure is for CA PDCP duplication or DC PDCP duplication. The performance parameter may indicate a cell identifier associated with the PDCP duplication procedure, a signal quality associated with reception of the PDUs (e.g., cell level or beam level), and/or an indication to modify the PDCP duplication procedure. UE 120 may report one or a plurality of performance parameters, alone or in any combination.

In some aspects, UE 120 may report performance parameters immediately (referred to as an immediate mode) or, alternatively, UE 120 may store or log performance parameters during a log period (referred to as a logged mode). UE 120 may also report performance parameters when a logging period expires, or when UE 120 moves out of a valid area. A configuration parameter may indicate the logging period, the valid area, and/or a valid time. Base station 110 may obtain the performance parameters using, for example, RRC signaling. In some aspects, UE 120 may report performance parameters following a radio resource management (RRM) procedure.

In some aspects regarding the logged mode, UE 120 may store performance parameters in a log file and suspend determination of performance parameters when UE 120 enters RRC_IDLE/INACTIVE mode. On entering RRC_CONNECTED mode, UE 120 may report performance parameters that were logged in the log file. UE 120 may also continue to determine performance parameters when UE 120 enters RRC_CONNECTED mode in the case where PDCP duplication is activated. UE 120 may update the log file in RRC_CONNECTED mode to delete logged performance parameters and/or add performance parameters determined during RRC_CONNECTED mode.

Each RLC entity may have one or more performance parameter indices (e.g., KPI indices 1-6) that correspond to PDCP duplication performance of the respective RLC entity as compared to the other RLC entities. Each performance parameter index may have a value (referred to as a credit point in this example) that is favorably changed (e.g., increased by 1) or unfavorably changed (e.g., decreased by 1). Different PDCP duplication conditions may increase or decrease the credit point of a performance parameter index for an RLC entity. UE 120 may use performance parameter index credit points for the RLC entities to determine PDCP duplication actions to perform. For example, UE 120 may determine percentages of performance parameter indices for RLC entities and activate or deactivate an RLC entity based at least in part on the percentage or a ratio of respective credit points of a certain RLC entity (or other RLC entities) with respect to a total number of PDCP PDUs transmitted by base station 110.

In an example, a first performance parameter index (e.g., KPI-1) may indicate a number or percentage of PDUs received on multiple RLC entities. In some aspects, if UE 120 successfully receives each PDCP PDU for each of the multiple RLC entities, UE 120 may increase (or otherwise favorably change) a credit point of the first performance parameter index for an RLC entity (e.g., increase by 1). In some aspects, base station 110, as a transmitting device, may increase a credit point of the first performance parameter index if an RLC entity is configured with acknowledged mode, and if base station 110 determines that a PDCP PDU is successfully received by UE 120 via an RLC entity. In some aspects, the credit point for this performance parameter index (or any other performance parameter index) may be increased or decreased for each PDCP PDU.

Additionally, or alternatively, a second performance parameter index (e.g., KPI-2) indicates a number or percentage of PDUs received on a certain RLC entity. In some aspects, if UE 120 successfully receives each PDCP PDU for the certain RLC entity, UE 120 may increase a credit point of the second performance parameter index for the certain RLC entity. In some aspects, base station 110, as a transmitting device, may increase a credit point of the second performance parameter index if the certain RLC entity is configured with acknowledged mode, and if base station 110 determines that that UE 120 successfully receives each PDCP PDU for the certain RLC entity.

Additionally, or alternatively, a third performance parameter index (e.g., KPI-3) may indicate a number or percentage of PDUs received on a certain RLC entity but not on any other RLC entities. In some aspects, if UE 120 successfully receives each PDCP PDU for the certain RLC entity, but not on any other RLC entity, UE 120 may increase a credit point of the third performance parameter index for the certain RLC entity. In some aspects, base station 110, as a transmitting device, may increase a credit point of the third performance parameter index if the certain RLC entity is configured with acknowledged mode, and if base station 110 determines that PDCP PDU transmission was successful by the certain RLC entity and not any other RLC entity.

Additionally, or alternatively, a fourth performance parameter index (e.g., KPI-4) may indicate a number or percentage of PDUs received by a certain RLC entity at an earlier time than another RLC entity or all other RLC entities. In some aspects, if UE 120 successfully receives each PDCP PDU with a certain sequence number indicating an earliest time for the certain RLC entity, UE 120 may increase a credit point of the fourth performance parameter index for the RLC entity. In some aspects, base station 110, as a transmitting device, may increase a credit point of the fourth performance parameter index if the certain RLC entity is configured with acknowledged mode, and if base station 110 determines that PDCP PDU reception by a certain RLC entity is successful at an earliest time as compared to the other RLC entities.

Additionally, or alternatively, a fifth performance parameter index (e.g., KPI-5) may indicate a number or percentage of PDUs not received by any RLC entity. In some aspects, if UE 120 does not receive each PDCP PDU from any RLC entity, UE 120 may increase a credit point of the fifth performance parameter index. In some aspects, base station 110, as a transmitting device, may increase a credit point of the fifth performance parameter index if RLC entities are configured with acknowledged mode, and if base station 110 determines that no RLC entity successfully received each PDCP PDU.

Additionally, or alternatively, a sixth performance parameter index (e.g., KPI-6) may indicate a PDCP duplication cancellation. In some aspects, if a certain number or percentage of PDUs is cancelled on one or more RLC entities due to successful transmission on a certain other RLC entity, UE 120 may increase a credit point of the sixth performance parameter index for the certain RLC entity. In some aspects, base station 110, as a transmitting device, may increase a credit point of the sixth performance parameter index if RLC entities are configured with acknowledged mode, and if base station 110 determines that an RLC entity successfully received each PDCP PDU and a cancellation message was sent to the other RLC entities.

As indicated above, FIG. 5 is provided as an example. Other examples may differ from what is described with regard to FIG. 5.

Figure 6:
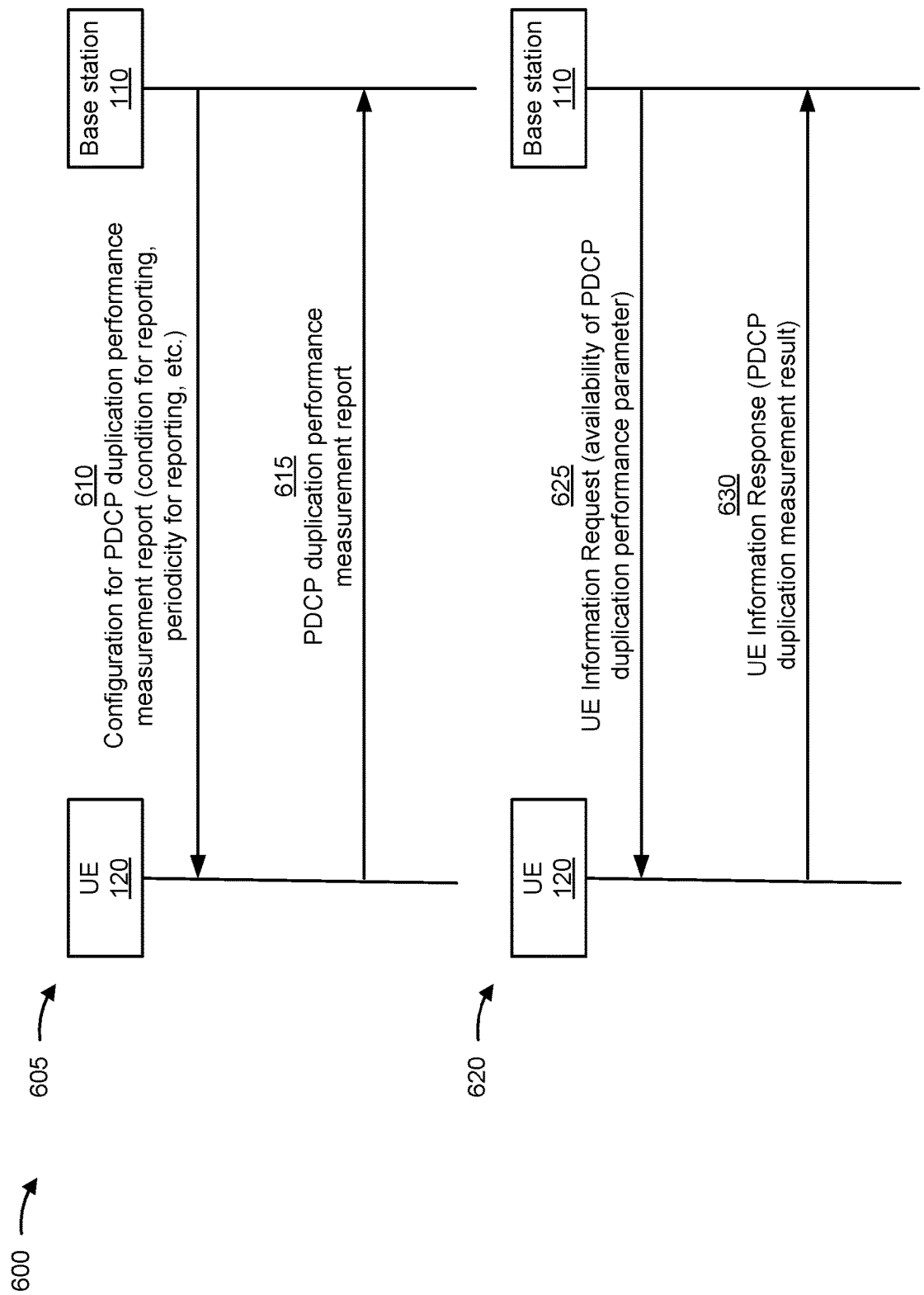

FIG. 6 is a diagram illustrating an example 600 of measuring performance of PDCP duplication, in accordance with various aspects of the present disclosure. As shown in FIG. 6, a wireless communication device (e.g., base station 110) may communicate with another wireless communication device (e.g., UE 120) using PDCP, as described above in connection with FIGS. 3, 4, and/or 5.

As shown by reference number 605, base station 110 may configure UE 120 to provide a PDCP duplication performance measurement report. For example, as shown by reference number 610, base station 110 may transmit to UE 120 a configuration for a PDCP duplication performance measurement report. This configuration may include, for example, a condition for reporting, periodicity for reporting, and/or the like. The configuration for PDCP duplication may be signaled via RRC signaling.

As shown by reference number 615, UE 120 may transmit a PDCP duplication measurement report to base station 110. The PDCP duplication measurement report may include a DRB identifier associated with the PDCP duplication procedure, a cell identifier associated with the PDCP duplication procedure, and/or an indication of whether the PDCP duplication procedure is for CA PDCP duplication or DC PDCP duplication. The PDCP duplication measurement report may also, or alternatively, include a performance parameter index that identifies a performance parameter type of the performance parameter and/or a corresponding RLC entity identifier that indicates an RLC entity associated with the performance parameter. The PDCP duplication measurement report may also, or alternatively, include a signal quality indicator associated with reception of the PDUs of a cell, a beam, or a channel (channel quality indicator, or CQI). The PDCP duplication measurement report may also, or alternatively, include an indication to modify the PDCP duplication procedure.

As shown by reference number 620, UE 120 may receive a request for a performance parameter from base station 110 and transmit the performance parameter to base station 110 based at least in part on receiving the request. The request may be in response to UE 120 transmitting, in an RRC message to base station 110, an indication that the performance parameter is available. For example, as shown by reference number 625, base station 110 may transmit a UE information request. This may include information about the availability of a PDCP duplication performance parameter. UE 120 may have indicated an availability of logged performance parameters. This indication may have been in an RRC setup message, a resume message, and/or a complete message. In some aspects, base station 110 may request that UE 120 send collected performance parameters or a log of collected performance parameters via RRC signaling. As shown by reference number 630, UE 120 may transmit a UE information response, which may include a PDCP duplication measurement report. The PDCP duplication measurement report may be signaled via a PDCP control PDU.

In some aspects, UE 120 may provide information that includes an indication to deconfigure or deactivate an RLC entity that is under-utilized, reconfigure or activate PDCP duplication with more RLC entities for a certain MAC entity, and/or reconfigure PDCP duplication to DC PDCP duplication or CA PDCP duplication.

As indicated above, FIG. 6 is provided as an example. Other examples may differ from what is described with regard to FIG. 6.

Figure 7:
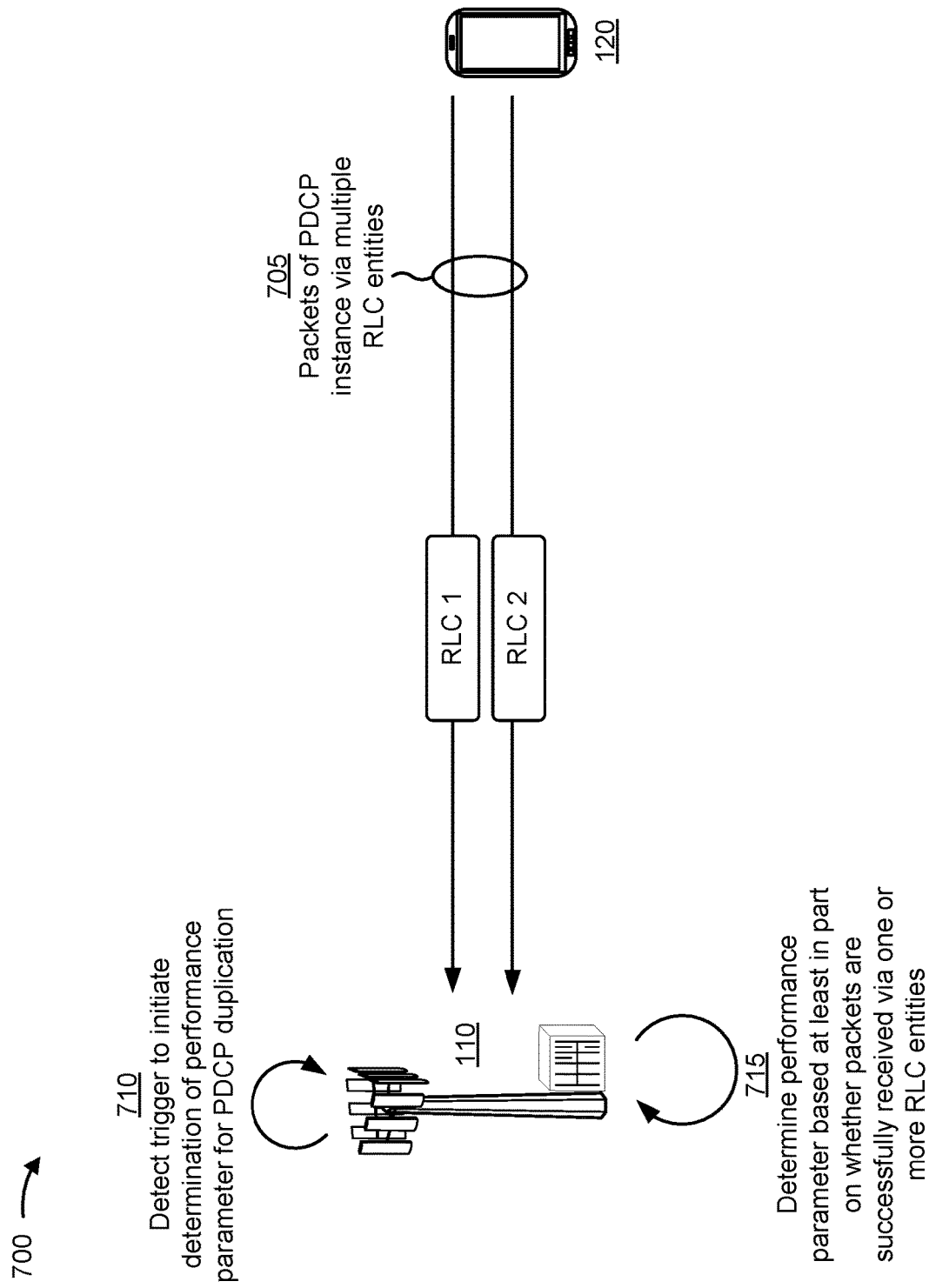

FIG. 7 is a diagram illustrating an example 700 of measuring performance of PDCP duplication, in accordance with various aspects of the present disclosure.

It has been explained that while certain operations are described for base station 110 and UE 120, base station 110 may perform the operations described herein for UE 120, and vice-versa. Accordingly, while FIG. 4 illustrates a base station 110 that transmits PDCP PDUs to a UE 120, FIG. 7 illustrates a UE 120 that may transmit PDCP PDUs to a base station 110. Base station 110 in FIG. 7 may perform the operations described for UE 120 in connection with FIGS. 3, 4, 5, and/or 6. UE 120 in FIG. 7 may perform the operations described for base station 110 in connection with FIGS. 3, 4, 5, and/or 6.

As shown by reference number 705, base station 110 may receive, from UE 120, PDUs of a PDCP instance via multiple RLC entities according to a PDCP duplication procedure. As shown by reference number 710, base station 110 may detect a trigger to initiate determination of a performance parameter for the PDCP duplication procedure associated with the PDCP instance. Note that, as described above in connection with FIG. 4, the detecting and receiving may take place in any order and/or simultaneously. As shown by reference number 715, base station 110 may determine the performance parameter based at least in part on whether PDUs of the PDCP instance are successfully received via one or more RLC entities of the multiple RLC entities.

As indicated above, FIG. 7 is provided as an example. Other examples may differ from what is described with regard to FIG. 7.

Figure 8:
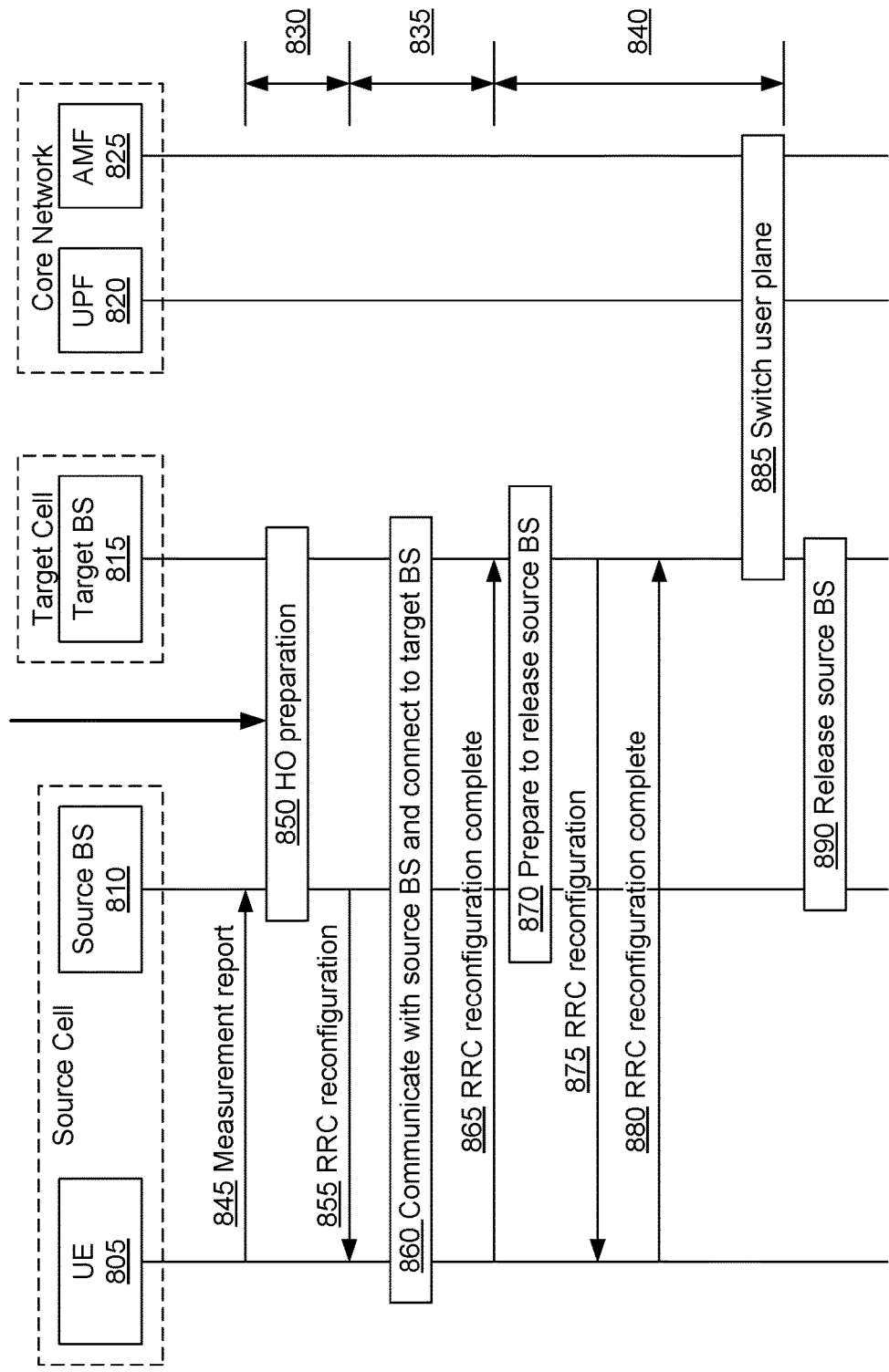

FIG. 8 is a diagram illustrating an example 800 of measuring performance of PDCP duplication, in accordance with various aspects of the present disclosure.

As mentioned earlier, an MBB HO procedure is one of the example scenarios for measuring PDCP duplication performance. Base station 110 and/or UE 120 may measure performance of PDCP duplication during and/or after the MBB HO procedure. Some further details of the MBB HO procedure will be provided as context.

As shown in FIG. 8, an MBB HO procedure may involve a UE 805, a source base station 810, a target base station 815, a user plane function (UPF) device 820, and an access and mobility management function (AMF) device 825. UE 805 may correspond to UE 120 described elsewhere herein. Source base station 810 and/or target base station 815 may correspond to base station 110 described elsewhere herein. UE 805 and source base station 810 may be connected (e.g., may have an RRC connection) via a serving cell or a source cell, and UE 805 may undergo a handover to target base station 815 via a target cell. UPF device 820 and/or AMF device 825 may be located within a core network. Source base station 810 and target base station 815 may be in communication with the core network for mobility support and user plane functions. In some aspects, an MBB HO procedure may include an enhanced MBB (eMBB) HO procedure.

The MBB HO procedure may include several phases. As shown, the MBB HO procedure may include a handover preparation phase 830, a handover execution phase 835, and a handover completion phase 840. During handover preparation phase 830, UE 805 may report measurements that cause source base station 810 and/or target base station 815 to prepare for handover and trigger execution of the handover. During handover execution phase 835, UE 805 may execute the handover by performing a random access procedure with target base station 815 and establishing an RRC connection with target base station 815. During handover completion phase 840, source base station 810 may forward stored communications associated with UE 805 to target base station 815, and UE 805 may be released from a connection with source base station 805.

The signaling and operations of the MBB HO procedure will now be described. As shown by reference number 845, UE 805 may perform one or more signal measurements, and may transmit a signal measurement report to source base station 810 based at least in part on performing the one or more signal measurements (e.g., serving cell measurements, neighbor cell measurements, and/or the like). The signal measurement report may indicate, for example, a reference signal received power (RSRP) parameter, a reference signal received quality (RSRQ) parameter, a received signal strength indicator (RSSI) parameter, a signal-to-interference-plus-noise-ratio (SINR) parameter, and/or the like (e.g., for the serving cell, one or more neighbor cells, and/or the like). Source base station 810 may use the signal measurement report to determine whether to trigger a handover to target base station 815. For example, if one or more signal measurements satisfy a condition, then source base station 810 may trigger a handover of UE 805 to target base station 815.

As shown by reference number 850, source base station 810 and target base station 815 may communicate with one another to prepare for a handover of UE 805. As part of the handover preparation, source base station 810 may transmit a handover request to target base station 815 to instruct target base station 815 to prepare for the handover. Source base station 810 may communicate RRC context information associated with UE 805 and/or configuration information associated with UE 805 to target base station 815. Target base station 815 may prepare for the handover by reserving resources for UE 805. After reserving the resources, target base station 815 may transmit an acknowledgement (ACK) to source base station 810 in response to the handover request.

In some aspects, source base station 810 and target base station 815 may negotiate PDCP duplication configuration and performance parameters during HO preparation 850 and this negotiation will be described later. For now, the rest of the MBB HO procedure will be explained.

As shown by reference number 855, source base station 810 may transmit an RRC reconfiguration message to UE 805. The RRC reconfiguration message may include a handover command instructing UE 805 to execute a handover procedure from source base station 810 to target base station 815. The handover command may include information associated with target base station 815, such as a random access channel (RACH) preamble assignment for accessing target base station 815. Reception of the RRC reconfiguration message, including the handover command, by UE 805 may trigger the start of handover execution phase 835.

As shown by reference number 860, during handover execution phase 885 of the MBB HO procedure, UE 805 may execute the handover by performing a random access procedure with target base station 815 (e.g., including synchronization with the target base station 815) while continuing to communicate with source base station 810. For example, while UE 805 is performing the random access procedure with target base station 815, UE 805 may transmit uplink data, uplink control information, an uplink reference signal (e.g., a sounding reference signal), and/or the like to source base station 810, and/or may receive downlink data, downlink control information, a downlink reference signal, and/or the like from source base station 810. As part of the MBB HO procedure, UE 805 may maintain simultaneous connections with source base station 810 and target base station 815. In some aspects, target base station 815, source base station 810, and/or UE 805 may, during the MBB HO procedure, detect a trigger to initiate determination of a performance parameter for a PDCP duplication procedure associated with a PDCP instance, receive PDUs of the PDCP instance via multiple RLC entities according to the PDCP duplication procedure, and determine the performance parameter based at least in part on whether PDUs of the PDCP instance are successfully received via one or more RLC entities of the multiple RLC entities.

As shown by reference number 865, upon successfully establishing a connection with target base station 815 (e.g., via a random access procedure), UE 805 may transmit an RRC reconfiguration completion message to target base station 815. Reception of the RRC reconfiguration message by target base station 815 may trigger the start of handover completion phase 840.

As part of handover completion phase 840 involving uplink PDCP duplication, source base station 810 may forward downlink PDUs, via an Xn interface, to target base station 815. Source base station 810 may also transmit decompressed uplink PDCP service data units (SDUs) to target base station 815. Source base station 810 and/or target base station may reorder PDCP PDUs (and/or SDUs) and/or discard duplicate PDCP PDUs (and/or SDUs). Source base station 810 and/or target base station 815 may use robust header compression (ROHC) contexts in association with transmitting and/or receiving PDCP PDUs (and/or SDUs).

As part of handover completion phase 840 involving downlink PDCP duplication, source base station 810 may forward downlink PDUs, via an Xn interface, to target base station 815. Source base station 810 may transmit decompressed downlink PDCP SDUs to target base station 815. Source base station 810 may also transmit the downlink PDCP SDUs with a serial number to use for reordering. Source base station 810 and/or target base station 815 may use ROHC contexts in association with transmitting and/or receiving PDCP PDUs (and/or SDUs).

As shown by reference number 870, source base station 810 and target base station 815 may communicate with one another to prepare for release of the connection between source base station 810 and UE 805. In some aspects, target base station 815 may determine that a connection between source base station 810 and UE 805 is to be released, such as after receiving the RRC reconfiguration message from UE 805. In this case, target base station 815 may transmit a handover connection setup completion message to source base station 810. The handover connection setup completion message may cause source base station 810 to stop transmitting data to UE 805 and/or to stop receiving data from UE 805. Additionally, or alternatively, the handover connection setup completion message may cause source base station 810 to forward communications associated with UE 805 to target base station 815 and/or to notify target base station 815 of a status of one or more communications with UE 805. For example, source base station 810 may forward, to target base station 815, buffered downlink communications (e.g., downlink data) for UE 805 and/or uplink communications (e.g., uplink data) received from UE 805. Additionally, or alternatively, source base station 810 may notify target base station 815 regarding a PDCP duplication status associated with UE 805, a sequence number to be used for a downlink communication with UE 805, and/or the like.

As shown by reference number 875, target base station 815 may transmit an RRC reconfiguration message to UE 805 to instruct UE 805 to release the connection with source base station 810. Upon receiving the instruction to release the connection with source base station 810, UE 805 may stop communicating with source base station 810. For example, UE 805 may refrain from transmitting uplink communications to source base station 810 and/or may refrain from monitoring for downlink communications from source base station 810.

As shown by reference number 880, UE 805 may transmit an RRC reconfiguration completion message to target base station 815 to indicate that the connection between source base station 810 and UE 805 is being released or has been released.

As shown by reference number 885, target base station 815, UPF device 820, and/or AMF device 825 may communicate to switch a user plane path of UE 805 from source base station 810 to target base station 815. Prior to switching the user plane path, downlink communications for UE 805 may be routed through the core network to source base station 810. After the user plane path is switched, downlink communications for UE 805 may be routed through the core network to the target base station 815. As shown by reference number 890, target base station 815 and source base station 810 may communicate to release source base station 810. In some aspects, target base station 815, source base station 810, and/or UE 805 may determine a performance parameter and/or other performance parameters after the MBB HO procedure.

Referring back to HO preparation 850, in some aspects, source base station 810 and target base station 815 may negotiate a PDCP duplication performance parameter, a PDCP configuration parameter, and/or the like during HO preparation 850. For example, source base station 810 may transmit a handover request (e.g., via an Xn interface or N2 message) to target base station 815, wherein the handover request may include a PDCP duplication configuration parameter and/or a PDCP duplication performance parameter. Target base station 815 may receive the PDCP duplication configuration parameter and/or the PDCP duplication performance parameter. In some aspects, target base station 815 may accept and/or provide support for the PDCP duplication configuration parameter and/or the PDCP duplication performance parameter. In response to determining that target base station 815 will support the PDCP duplication configuration parameter and/or the PDCP duplication performance parameter, source base station 810 may inform target base station 815 about a credit point, related information, and/or the like that is respectively associated with one or more RLC entities. In some aspects, target base station 815 may reject or not provide support for the PDCP duplication configuration parameter and/or the PDCP duplication performance parameter.

If uplink PDCP duplication is involved, source base station 810 may forward an uplink PDCP SDU from UE 805 to target base station 815 with information identifying on which RLC entities the PDCP PDUs were received. Source base station 810 may forward the information if a performance parameter was not determined on the forwarded uplink PDCP SDU. During the MBB HO procedure, target base station 815 may determine a performance parameter index for one or more RLC entities based at least in part on the forwarded uplink PDCP SDU and/or a credit point transmitted by source base station 810 for the one or more RLC entities. Target base station 815 may also determine a PDCP duplication performance parameter and update a status of a determination based at least in part on a PDCP status report from UE 805. Target base station 815 may tag the PDCP duplication performance parameter with a DRB identifier, a logical channel identifier, and/or a cell identifier for the target cell.

If downlink PDCP duplication is involved, UE 805 may determine a performance parameter index for one or more RLC entities during the MBB HO procedure. UE 805 may tag the PDCP duplication performance parameter with a DRB identifier, a logical channel identifier, and/or a cell identifier for the target cell.

As indicated above, FIG. 8 is provided as an example. Other examples may differ from what is described with regard to FIG. 8.

Figure 9:
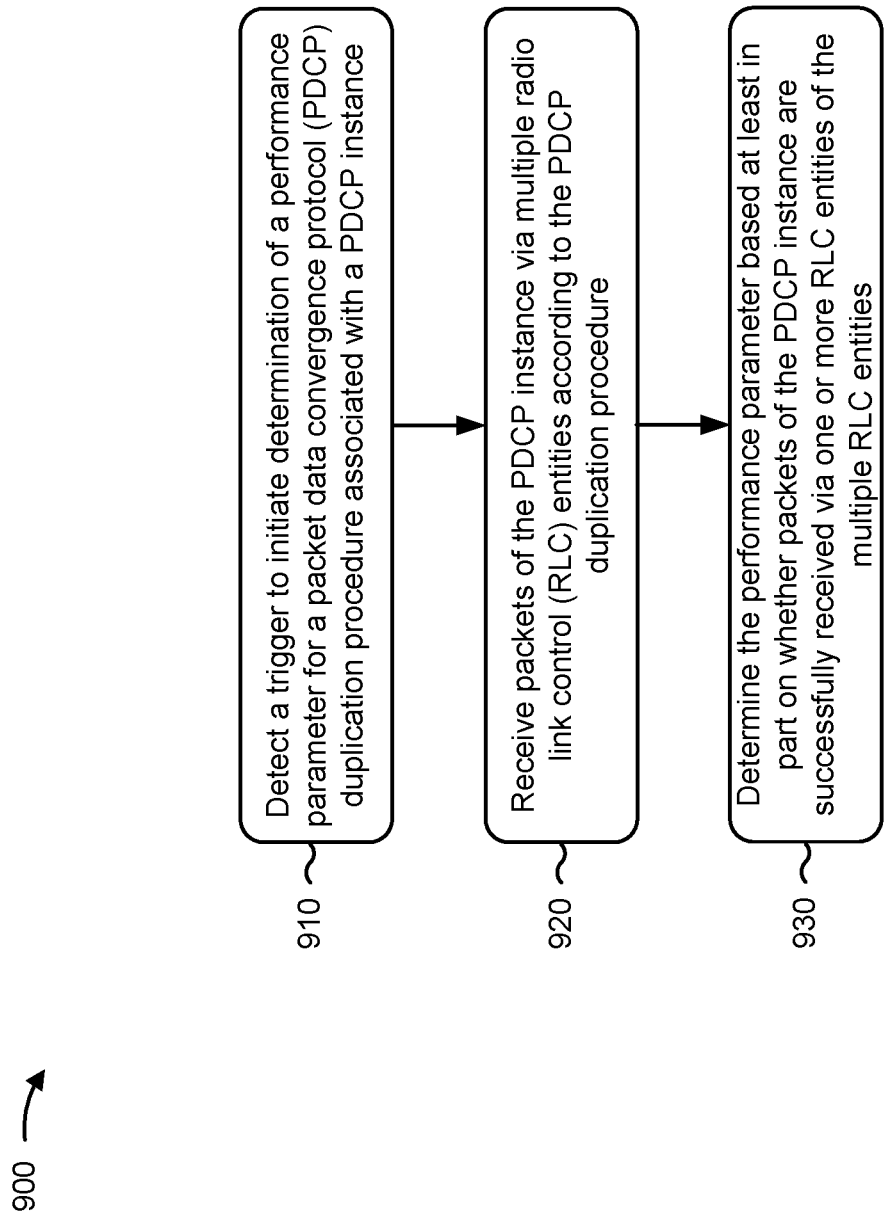
FIG. 9 is a diagram illustrating an example process performed, for example, by a wireless communication device, in accordance with various aspects of the present disclosure.

FIG. 9 is a diagram illustrating an example process 900 performed, for example, by a wireless communication device, in accordance with various aspects of the present disclosure. Example process 900 is an example where a wireless communication device (e.g., base station 110, UE 120, UE 805, source base station 810, target base station 815, and/or the like) performs operations associated with measuring performance of PDCP duplication.

As shown in FIG. 9, in some aspects, process 900 may include detecting a trigger to initiate determination of a performance parameter for a PDCP duplication procedure associated with a PDCP instance (block 910). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may detect a trigger to initiate determination of a performance parameter for a PDCP duplication procedure associated with a PDCP instance, as described above.

As further shown in FIG. 9, in some aspects, process 900 may include receiving packets of the PDCP instance via multiple RLC entities according to the PDCP duplication procedure (block 920). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive packets of the PDCP instance via multiple RLC entities according to the PDCP duplication procedure, as described above.

As further shown in FIG. 9, in some aspects, process 900 may include determining the performance parameter based at least in part on whether packets of the PDCP instance are successfully received via one or more RLC entities of the multiple RLC entities (block 930). For example, the wireless communication device (e.g., using controller/processor 240, controller/processor 280, and/or the like) may determine the performance parameter based at least in part on whether packets of the PDCP instance are successfully received via one or more RLC entities of the multiple RLC entities, as described above.

Process 900 may include additional aspects, such as any single aspect or any combination of aspects described below and/or in connection with one or more other processes described elsewhere herein.

In a first aspect, the performance parameter indicates a number or percentage of packets of the PDCP instance that are successfully received via all of the multiple RLC entities.

In a second aspect, alone or in combination with the first aspect, the performance parameter indicates a number or percentage of packets of the PDCP instance that are successfully received via a specific RLC entity of the multiple RLC entities.

In a third aspect, alone or in combination with one or more of the first and second aspects, the performance parameter indicates a number or percentage of packets of the PDCP instance that are successfully received via a first RLC entity of the multiple RLC entities and that are not successfully received via any other RLC entities of the multiple RLC entities.

In a fourth aspect, alone or in combination with one or more of the first through third aspects, the performance parameter indicates a number or percentage of packets of the PDCP instance that are successfully received via a first RLC entity of the multiple RLC entities and that are not successfully received via a second RLC entity of the multiple RLC entities.

In a fifth aspect, alone or in combination with one or more of the first through fourth aspects, the performance parameter indicates a number or percentage of packets of the PDCP instance that are successfully received via a first RLC entity of the multiple RLC entities at an earlier time as compared to all other RLC entities of the multiple RLC entities.

In a sixth aspect, alone or in combination with one or more of the first through fifth aspects, the performance parameter indicates a number or percentage of packets of the PDCP instance that are successfully received via a first RLC entity of the multiple RLC entities at an earlier time as compared to a second RLC entity of the multiple RLC entities.

In a seventh aspect, alone or in combination with one or more of the first through sixth aspects, the performance parameter indicates a number or percentage of packets of the PDCP instance that are not successfully received via any of the multiple RLC entities.

In an eighth aspect, alone or in combination with one or more of the first through seventh aspects, the performance parameter indicates a number or percentage of packets of the PDCP instance that are not successfully received via a specific RLC entity of the multiple RLC entities.

In a ninth aspect, alone or in combination with one or more of the first through eighth aspects, the performance parameter indicates a number or percentage of packets of the PDCP instance that are canceled or discarded for a specific RLC entity of the multiple RLC entities due to successful reception via another RLC entity of the multiple RLC entities.

In a tenth aspect, alone or in combination with one or more of the first through ninth aspects, detecting the trigger comprises detecting that a data rate of packets of the PDCP instance satisfies a threshold for one or more RLC entities of the multiple RLC entities.

In an eleventh aspect, alone or in combination with one or more of the first through tenth aspects, detecting the trigger comprises detecting that a number or percentage of slots in which packets of the PDCP instance are received satisfies a threshold for one or more RLC entities of the multiple RLC entities.

In a twelfth aspect, alone or in combination with one or more of the first through eleventh aspects, detecting the trigger comprises detecting that a number or percentage of packets of the PDCP instance that are not successfully received satisfies a threshold for one or more RLC entities of the multiple RLC entities.

In a thirteenth aspect, alone or in combination with one or more of the first through twelfth aspects, detecting the trigger comprises detecting that a number or percentage of retransmissions of packets of the PDCP instance satisfies a threshold for one or more RLC entities of the multiple RLC entities.

In a fourteenth aspect, alone or in combination with one or more of the first through thirteenth aspects, the wireless communication device is a user equipment, the PDCP duplication procedure is a downlink PDCP duplication procedure, and the multiple RLC entities are configured in either an RLC acknowledged mode or an RLC unacknowledged mode.

In a fifteenth aspect, alone or in combination with one or more of the first through thirteenth aspects, the wireless communication device is a base station, the PDCP duplication procedure is an uplink PDCP duplication procedure, and the multiple RLC entities are configured in either an RLC acknowledged mode or an RLC unacknowledged mode.

In a sixteenth aspect, alone or in combination with one or more of the first through thirteenth aspects, the wireless communication device is a user equipment, the PDCP duplication procedure is an uplink PDCP duplication procedure, and the multiple RLC entities are configured in an RLC acknowledged mode.

In a seventeenth aspect, alone or in combination with one or more of the first through thirteenth aspects, the wireless communication device is a base station, the PDCP duplication procedure is a downlink PDCP duplication procedure, and the multiple RLC entities are configured in an RLC acknowledged mode.

In an eighteenth aspect, alone or in combination with one or more of the first through seventeenth aspects, process 900 further comprises receiving a configuration message that indicates one or more configuration parameters for measuring performance of the PDCP duplication procedure.

In a nineteenth aspect, alone or in combination with one or more of the first through eighteenth aspects, the one or more configuration parameters indicate at least one of: the performance parameter to be determined by the wireless communication device, the multiple RLC entities for which the performance parameter is to be determined, the trigger for initiating determination of the performance parameter, a condition for reporting the performance parameter, a periodicity for reporting the performance parameter, an area in which the performance parameter is to be measured, a time during which the performance parameter is to be measured, or a combination thereof.

In a twentieth aspect, alone or in combination with one or more of the first through nineteenth aspects, process 900 further comprises reporting the performance parameter to a base station based at least in part on at least one of: the periodicity for reporting the performance parameter, a determination that the performance parameter satisfies the condition for reporting the performance parameter, a determination that the wireless communication device has exited the area in which the performance parameter is to be measured, a determination that the time during which the performance parameter is to be measured has elapsed, or a combination thereof.

In a twenty first aspect, alone or in combination with one or more of the first through twentieth aspects, process 900 further comprises reporting the performance parameter to a base station.

In a twenty second aspect, alone or in combination with one or more of the first through twenty first aspects, the performance parameter is reported in a measurement report.

In a twenty third aspect, alone or in combination with one or more of the first through twenty second aspects, the performance parameter is reported in a PDCP packet data unit.

In a twenty fourth aspect, alone or in combination with one or more of the first through twenty third aspects, the performance parameter is reported in a report that indicates at least one of: a dedicated radio bearer identifier associated with the PDCP duplication procedure, a performance parameter index that identifies a performance parameter type of the performance parameter, an RLC identifier that indicates an RLC entity associated with the performance parameter, an indication of whether the PDCP duplication procedure is for carrier aggregation PDCP duplication or dual connectivity PDCP duplication, a cell identifier associated with the PDCP duplication procedure, a signal quality associated with reception of the packets, an indication to modify the PDCP duplication procedure, or a combination thereof.

In a twenty fifth aspect, alone or in combination with one or more of the first through twenty fourth aspects, process 900 further comprises transmitting, in a radio resource control message to a base station, an indication that the performance parameter is available; receiving a request for the performance parameter from the base station; and transmitting the performance parameter to the base station based at least in part on receiving the request.

In a twenty sixth aspect, alone or in combination with one or more of the first through twenty fifth aspects, the wireless communication device is a source base station of a make-before-break handover procedure. In some aspects, process 900 further comprises transmitting the performance parameter to a target base station of the make-before-break handover procedure as part of handover preparation.

In a twenty seventh aspect, alone or in combination with one or more of the first through twenty sixth aspects, process 900 further comprises transmitting one or more configuration parameters, for measuring performance of the PDCP duplication procedure, to the target base station.

In a twenty eighth aspect, alone or in combination with one or more of the first through twenty seventh aspects, the wireless communication device is a target base station of a make-before-break handover procedure. In some aspects, process 900 further comprises receiving the performance parameter from a source base station of the make-before-break handover procedure as part of handover preparation.

In a twenty ninth aspect, alone or in combination with one or more of the first through twenty eighth aspects, process 900 further comprises receiving one or more configuration parameters, for measuring performance of the PDCP duplication procedure, from the source base station.

In a thirtieth aspect, alone or in combination with one or more of the first through twenty ninth aspects, process 900 further comprises modifying the PDCP duplication procedure based at least in part on the performance parameter.

In a thirty first aspect, alone or in combination with one or more of the first through thirtieth aspects, modifying the PDCP duplication procedure includes at least one of: deactivating or reconfiguring PDCP duplication for an RLC entity of the multiple RLC entities, activating PDCP duplication for an RLC entity, reconfiguring the PDCP duplication procedure from carrier aggregation PDCP duplication to dual connectivity PDCP duplication, reconfiguring the PDCP duplication procedure from dual connectivity PDCP duplication to carrier aggregation PDCP duplication, or a combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   detecting a trigger to initiate determination of a performance parameter for a packet data convergence protocol (PDCP) duplication procedure associated with a PDCP instance;
   receiving packets of the PDCP instance via multiple radio link control (RLC) entities according to the PDCP duplication procedure;
   determining the performance parameter based at least in part on whether the packets of the PDCP instance are successfully received via one or more RLC entities of the multiple RLC entities; and modifying, based at least in part on the performance parameter, the PDCP duplication procedure by deactivating a first RLC entity of the multiple RLC entities that is utilized for the PDCP duplication procedure less than a second RLC entity of the multiple RLC entities.

2. The method of claim 1, wherein the performance parameter indicates a number or percentage of packets of the PDCP instance that are successfully received via all of the multiple RLC entities.

3. The method of claim 1, wherein the performance parameter indicates a number or percentage of packets of the PDCP instance that are successfully received via a specific RLC entity of the multiple RLC entities.

4. The method of claim 1, wherein the performance parameter indicates a number or percentage of packets of the PDCP instance that are successfully received via a particular RLC entity of the multiple RLC entities and that are not successfully received via any other RLC entities of the multiple RLC entities.

5. The method of claim 1, wherein the performance parameter indicates a number or percentage of packets of the PDCP instance that are successfully received via a particular RLC entity of the multiple RLC entities and that are not successfully received via another RLC entity of the multiple RLC entities.

6. The method of claim 1, wherein the performance parameter indicates a number or percentage of packets of the PDCP instance that are successfully received via a particular RLC entity of the multiple RLC entities at an earlier time as compared to all other RLC entities of the multiple RLC entities.

7. The method of claim 1, wherein the performance parameter indicates a number or percentage of packets of the PDCP instance that are successfully received via a particular RLC entity of the multiple RLC entities at an earlier time as compared to another RLC entity of the multiple RLC entities.

8. The method of claim 1, wherein the performance parameter indicates a number or percentage of packets of the PDCP instance that are not successfully received via any of the multiple RLC entities.

9. The method of claim 1, wherein the performance parameter indicates a number or percentage of packets of the PDCP instance that are not successfully received via a specific RLC entity of the multiple RLC entities.

10. The method of claim 1, wherein the performance parameter indicates a number or percentage of packets of the PDCP instance that are canceled or discarded for a specific RLC entity of the multiple RLC entities due to successful reception via another RLC entity of the multiple RLC entities.

11. The method of claim 1, wherein detecting the trigger comprises detecting that a data rate of packets of the PDCP instance satisfies a threshold for one or more RLC entities of the multiple RLC entities.

12. The method of claim 1, wherein detecting the trigger comprises detecting that a number or percentage of slots in which packets of the PDCP instance are received satisfies a threshold for one or more RLC entities of the multiple RLC entities.

13. The method of claim 1, wherein detecting the trigger comprises detecting that a number or percentage of packets of the PDCP instance that are not successfully received satisfies a threshold for one or more RLC entities of the multiple RLC entities.

14. The method of claim 1, wherein detecting the trigger comprises detecting that a number or percentage of retransmissions of packets of the PDCP instance satisfies a threshold for one or more RLC entities of the multiple RLC entities.

15. The method of claim 1, wherein the wireless communication device is a user equipment, the PDCP duplication procedure is a downlink PDCP duplication procedure, and the multiple RLC entities are configured in either an RLC acknowledged mode or an RLC unacknowledged mode.

16. The method of claim 1, wherein the wireless communication device is a network entity, the PDCP duplication procedure is an uplink PDCP duplication procedure, and the multiple RLC entities are configured in either an RLC acknowledged mode or an RLC unacknowledged mode.

17. The method of claim 1, wherein the wireless communication device is a user equipment, the PDCP duplication procedure is an uplink PDCP duplication procedure, and the multiple RLC entities are configured in an RLC acknowledged mode.

18. The method of claim 1, wherein the wireless communication device is a network entity, the PDCP duplication procedure is a downlink PDCP duplication procedure, and the multiple RLC entities are configured in an RLC acknowledged mode.

19. The method of claim 1, further comprising:
receiving a configuration message that indicates one or more configuration parameters for measuring performance of the PDCP duplication procedure.

20. The method of claim 19, wherein the one or more configuration parameters indicate at least one of:
the performance parameter to be determined by the wireless communication device,
the multiple RLC entities for which the performance parameter is to be determined,
the trigger for initiating the determination of the performance parameter,
a condition for reporting the performance parameter,
a periodicity for reporting the performance parameter,
an area in which the performance parameter is to be measured,
a time during which the performance parameter is to be measured, or
a combination thereof.

21. The method of claim 20, further comprising:
reporting the performance parameter to a network entity based at least in part on at least one of:
the periodicity for reporting the performance parameter,
a determination that the performance parameter satisfies the condition for reporting the performance parameter,
a determination that the wireless communication device has exited the area in which the performance parameter is to be measured,
a determination that the time during which the performance parameter is to be measured has elapsed, or
a combination thereof.

22. The method of claim 1, further comprising:
reporting the performance parameter to a network entity.

23. The method of claim 22, wherein the performance parameter is reported in a measurement report.

24. The method of claim 22, wherein the performance parameter is reported in a PDCP packet data unit.

25. The method of claim 22, wherein the performance parameter is reported in a report that indicates at least one of:
a dedicated radio bearer identifier associated with the PDCP duplication procedure, a performance parameter index that identifies a performance parameter type of the performance parameter,
an RLC identifier that indicates an RLC entity associated with the performance parameter,
an indication of whether the PDCP duplication procedure is for carrier aggregation PDCP duplication or dual connectivity PDCP duplication,
a cell identifier associated with the PDCP duplication procedure,
a signal quality associated with reception of the packets,
an indication to modify the PDCP duplication procedure, or
a combination thereof.

26. The method of claim 1, further comprising:
transmitting, in a radio resource control message to a network entity, an indication that the performance parameter is available;
receiving a request for the performance parameter from the network entity; and
transmitting the performance parameter to the network entity based at least in part on receiving the request.

27. The method of claim 1, wherein the wireless communication device is a source network entity of a make-before-break handover procedure, and wherein the method further comprises:
transmitting the performance parameter to a target network entity of the make-before-break handover procedure as part of handover preparation.

28. The method of claim 27, further comprising:
transmitting one or more configuration parameters, for measuring performance of the PDCP duplication procedure, to the target network entity.

29. The method of claim 1, wherein the wireless communication device is a target network entity of a make-before-break handover procedure, and wherein the method further comprises:
receiving the performance parameter from a source network entity of the make-before-break handover procedure as part of handover preparation.

30. The method of claim 29, further comprising:
receiving one or more configuration parameters, for measuring performance of the PDCP duplication procedure, from the source network entity.

31. The method of claim 1, wherein modifying the PDCP duplication procedure includes reconfiguring the PDCP duplication procedure from carrier aggregation PDCP duplication to dual connectivity PDCP duplication.

32. The method of claim 1, wherein modifying the PDCP duplication procedure includes:
reconfiguring the PDCP duplication procedure from dual connectivity PDCP duplication to carrier aggregation PDCP duplication.

33. A wireless communication device for wireless communication, comprising:
one or more memories; and
one or more processors, coupled to the one or more memories, configured to:
detect a trigger to initiate determination of a performance parameter for a packet data convergence protocol (PDCP) duplication procedure associated with a PDCP instance;
receive packets of the PDCP instance via multiple radio link control (RLC) entities according to the PDCP duplication procedure;
determine the performance parameter based at least in part on whether the packets of the PDCP instance are successfully received via one or more RLC entities of the multiple RLC entities; and
modify, based at least in part on the performance parameter, the PDCP duplication procedure by deactivation of a first RLC entity of the multiple RLC entities that is utilized for the PDCP duplication procedure less than a second RLC entity of the multiple RLC entities.

34. A non-transitory computer-readable medium storing one or more instructions for wireless communication, the one or more instructions comprising:
one or more instructions that, when executed by one or more processors of a wireless communication device, cause the one or more processors to:
detect a trigger to initiate determination of a performance parameter for a packet data convergence protocol (PDCP) duplication procedure associated with a PDCP instance;
receive packets of the PDCP instance via multiple radio link control (RLC) entities according to the PDCP duplication procedure;
determine the performance parameter based at least in part on whether the packets of the PDCP instance are successfully received via one or more RLC entities of the multiple RLC entities; and
modify, based at least in part on the performance parameter, the PDCP duplication procedure by deactivation of a first RLC entity of the multiple RLC entities that is utilized for the PDCP duplication procedure less than a second RLC entity of the multiple RLC entities.

35. An apparatus for wireless communication, comprising:
means for detecting a trigger to initiate determination of a performance parameter for a packet data convergence protocol (PDCP) duplication procedure associated with a PDCP instance;
means for receiving packets of the PDCP instance via multiple radio link control (RLC) entities according to the PDCP duplication procedure;
means for determining the performance parameter based at least in part on whether the packets of the PDCP instance are successfully received via one or more RLC entities of the multiple RLC entities; and
means for modifying, based at least in part on the performance parameter, the PDCP duplication procedure by deactivating a first RLC entity of the multiple RLC entities that is utilized for the PDCP duplication procedure less than a second RLC entity of the multiple RLC entities.

* * * * *